(12) United States Patent
Ruehle et al.

(10) Patent No.: US 6,598,804 B2
(45) Date of Patent: Jul. 29, 2003

(54) FUEL INJECTOR

(75) Inventors: Wolfgang Ruehle, Ditzingen (DE); Joachim Stilling, Pfaffenhofen (DE); Martin Andorfer, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/151,842

(22) Filed: May 21, 2002

(65) Prior Publication Data

US 2003/0029930 A1 Feb. 13, 2003

(30) Foreign Application Priority Data

May 21, 2001 (DE) .......................... 101 24 744

(51) Int. Cl.⁷ .................. B05B 1/28; B05B 15/02
(52) U.S. Cl. ............... 239/104; 239/106; 239/114; 239/116; 239/117; 239/118; 239/585.1
(58) Field of Search ................... 239/104, 106, 239/114, 116, 117, 118, 123, 585.1, 585.2, 585.3, 585.4, 585.5

(56) References Cited

U.S. PATENT DOCUMENTS 4,796,816 A * 1/1989 Khinchuk .................. 239/118
5,553,790 A * 9/1996 Findler et al. ............. 239/585.1
6,109,542 A * 8/2000 Morris et al. .............. 239/585.1

FOREIGN PATENT DOCUMENTS

| DE | 844 378 | 7/1952 |
|---|---|---|
| DE | 36 14 564 | 11/1987 |
| DE | 37 10 467 | 12/1987 |
| DE | 195 41 508 | 5/1997 |
| DE | 198 04 463 A1 | 8/1999 |
| EP | 0 348 786 B1 | 8/1992 |

* cited by examiner

*Primary Examiner*—Robin O. Evans
(74) *Attorney, Agent, or Firm*—Kenyon & Kenyon

(57) ABSTRACT

A fuel injector for fuel injection systems of internal combustion engines has an actuator and a valve needle actuatable by the actuator, which valve needle is in turn coupled to, and actuates, a valve closing body. The valve closing body and a valve seat surface of a valve seat body form a sealing seat. At least one injection opening is formed in the valve seat body, and an elastic vibration element penetrates the injection opening. The elastic vibration element is attached on the inlet side of the injection opening and leaves a portion of cross-section of the injection opening free.

7 Claims, 2 Drawing Sheets

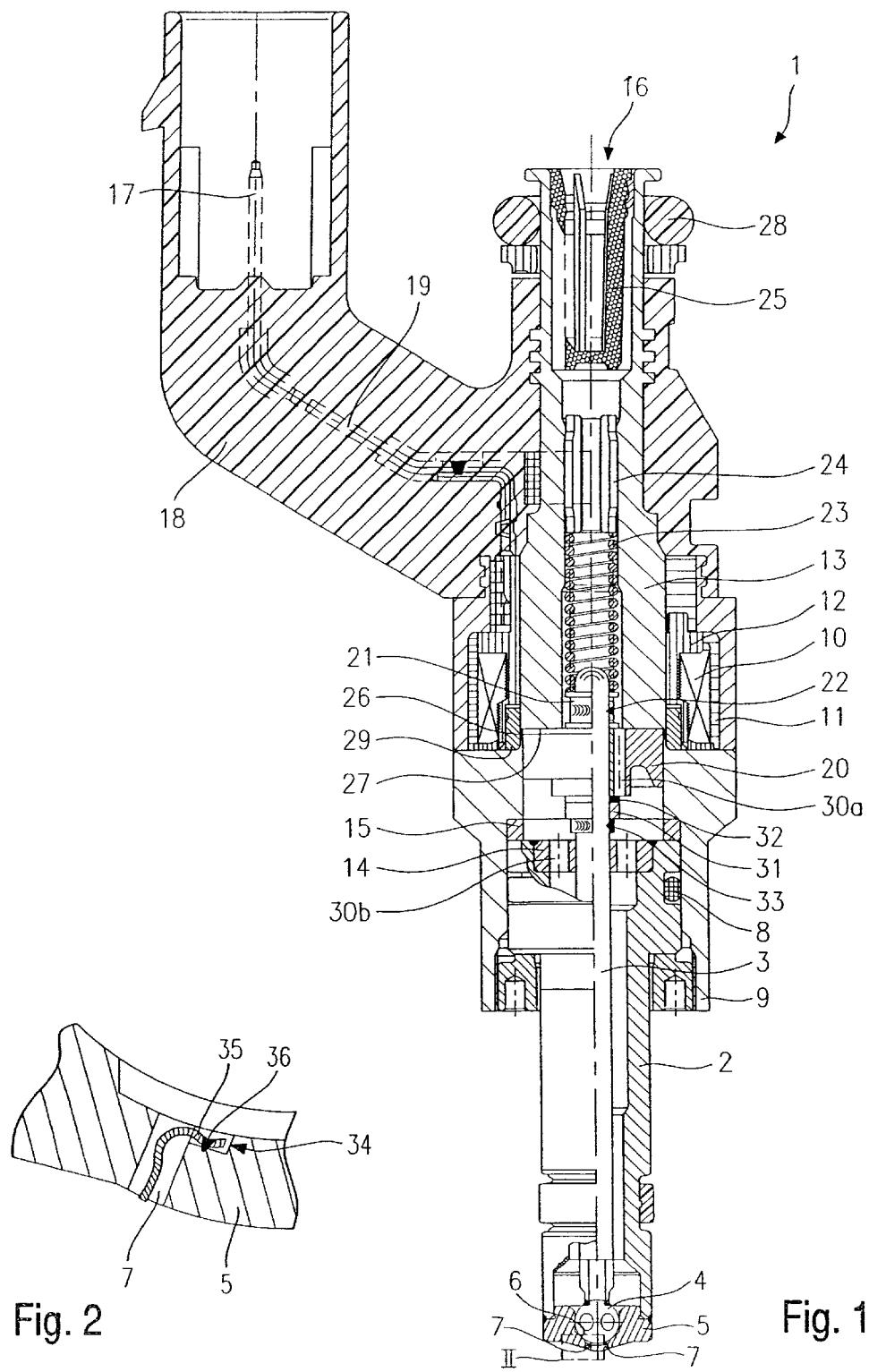

FUEL INJECTOR

FIELD OF THE INVENTION

The present invention relates to a fuel injector for fuel injection systems of internal combustion engines.

BACKGROUND INFORMATION

European Patent 348 786 B1 describes a fuel injector for an internal combustion engine having a nozzle body which has a transverse wall with an inner side and an outer side, a fuel channel leading to the outside through the transverse wall, and an outer chamber which is situated on the outer side of the transverse wall and extends between the transverse wall and an outlet opening and is delimited by a cylindrical wall of the nozzle body, which cylindrical wall has a length such that the fuel channel is kept free of deposits. This fuel injector is intended for injection of fuel into an intake manifold for the internal combustion engine.

The disadvantage of this type of known fuel injector is that the geometry of the fuel-jets through the outer cylinder is greatly limited, and the fuel injector is only usable for direct fuel injection with limitations. Furthermore, it is disadvantageous that the volume and the installation space of the outer cylinder, which screens off the fuel channel, interfere in the combustion chamber at the end of the compression stroke. In addition, arcing through of the fuel mixture in the outer cylinder cannot be prevented and, despite the screening-off effect of the outer cylinder, temperature peaks and coking may occur.

Published German Patent Application 198 04 463 A1 describes a fuel injection system for a compressed-mixture, externally-fired internal combustion engine, which includes a fuel injector that injects fuel into a combustion chamber formed by a piston/cylinder construction, and which is provided with a spark plug protruding into the combustion chamber. The fuel injector is provided with at least one row of injection holes distributed over the circumference of the fuel injector. By forming a mixture cloud using at least one jet, jet-controlled combustion is implemented through controlled injection of fuel through the injection holes.

The disadvantage of the fuel injector described in the above-mentioned document is that coking of the injection openings is not prevented. Because the fuel injector injects directly into a combustion chamber, it is subject to higher thermal stresses. Furthermore, due to the plurality of injection openings, the diameter of the injection openings is made smaller in order to allow small fuel amounts to be injected. The relative surface area in the injection bores wetted by fuel is larger and coking occurs more easily, which in turn results in impaired fuel jet and mixture formation.

SUMMARY OF THE INVENTION

The fuel injector according to the present invention provides the advantage over the conventional injectors in that coking deposits may be mechanically removed even in the case of very small injection openings, which may be oriented in any desired manner. Vibrations over the space of the injection opening are induced in the vibration element present in the flowing fuel in the injection opening by flow turbulence. The vibration element is in full or partial contact with the walls of the injection opening and is detached therefrom again. Thus, all wall areas of the injection opening are reached with a statistical distribution, and coking is mechanically knocked off and entrained by the flowing fuel.

The vibration element is made of an elastic material and is mainly subject to tensile stress. Therefore, the vibration element may have a very small material thickness which only slightly affects the cross section of the injection opening and thus the shape of the jet.

The vibration element may be a metal thread, which is attached in a recess of the valve seat body on the inlet side of the injection opening by spot welding. This exemplary embodiment allows a heat-resistant, high tensile strength vibration element to be implemented in a cost-effective manner.

BRIEF DESCRIPTION OF THE DRAWINGS

FIG. 1 shows a cross-sectional view of a first embodiment of a fuel injector according to the present invention.

FIG. 2 shows an enlarged cross-sectional view of section II of FIG. 1.

DETAILED DESCRIPTION OF THE INVENTION

Figure 3:
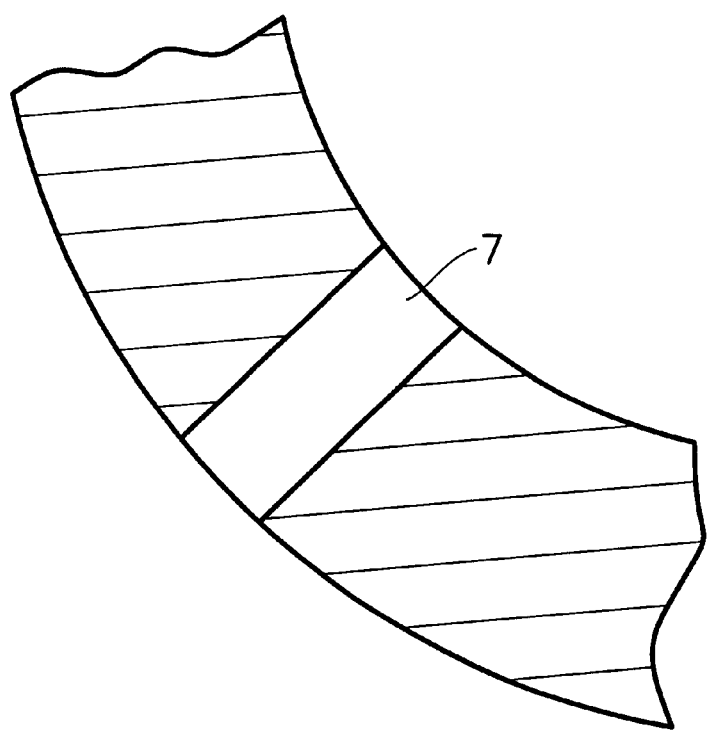
FIG 3 shows a perforated disk with an injection opening.

A first exemplary embodiment of a fuel injector according to the present invention is shown in FIG. 1 in the form of a fuel injector 1 for fuel injector systems of compressed-mixture, externally-fired internal combustion engines. Fuel injector 1 is particularly suitable for direct injection of fuel into a combustion chamber (not illustrated) of an internal combustion engine.

As shown in FIG. 1, Fuel injector 1 has a nozzle body 2, in which a valve needle 3 is situated. Valve needle 3 is mechanically linked to a valve closing body 4, which cooperates with a valve seat surface 6 arranged on a valve seat body 5 to form a sealing seat. Fuel injector 1 is, in the present embodiment, an inward opening fuel injector 1, which has a plurality of injection openings 7 made in valve seat body 5. Nozzle body 2 is sealed against a stationary pole 9 of a solenoid 10 by a seal 8. Solenoid 10 is encapsulated in a solenoid housing 11 and wound around a field spool 12, which rests on an internal pole 13 of solenoid 10. Internal pole 13 and stationary pole 9 are separated by a narrowing 26 and connected by a non-ferromagnetic connecting part 29. Solenoid 10 is excited via an electric current suppliable via an electric plug contact 17 and a line 19. Plug contact 17 is surrounded by a plastic casing 18, which may be extruded onto internal pole 13.

As shown in FIG. 1, valve needle 3 is guided in a disk-shaped valve needle guide 14. A matching adjusting disk 15 is used to adjust the lift, and an armature 20 is located on the other side of adjusting disk 15. Armature 20 is friction-locked to valve needle 3 via a first flange 21, and valve needle 3 is connected to first flange 21 by a weld 22. First flange 21 supports a restoring spring 23, which in the present exemplary embodiment of fuel injector 1 is pre-stressed by a sleeve 24. Fuel channels 30a to 30b run in valve needle guide 14, in armature 20, and on valve seat body 5. The fuel is supplied via a central fuel supply 16 and filtered by a filter element 25. Fuel injector 1 is sealed against a fuel line (not illustrated in detail) by a seal 28.

On the injection side of armature 20, there is an annular dampening element 32 made of an elastomeric material, which rests on a second flange 31, which in turn is attached to valve needle 3 by a weld 33.

In the rest position of fuel injector 1, armature 20 is acted upon by restoring spring 23 against its lift direction, so that valve closing body 4 is sealingly held on valve seat 6. When solenoid 10 is excited, it forms a magnetic field which moves armature 20 in the lift direction against the spring load of restoring spring 23, the lift being defined by a working clearance 27 between internal pole 12 and armature 20, as shown in FIG. 1. Armature 20 also entrains first flange 21, which is welded to valve needle 3, in the lift direction. Valve closing body 4, connected to valve needle 3, lifts from valve seat surface 6, and the fuel is injected through injection openings 7.

If the solenoid current is switched off, armature 20 drops from internal pole 13, after the magnetic field has sufficiently decayed, due to the pressure of restoring spring 23, whereby first flange 21, connected to valve needle 3, moves against the lift direction. Valve needle 3 is thus moved in the same direction, whereby valve closing body 4 comes into contact with valve seat surface 6 and fuel injector 1 is closed.

As shown in greater detail in FIG. 2, injection opening 7 is formed in valve seat body 5. A lateral recess 34 is formed in valve seat body 5 on an inlet side of injection opening 7. A vibration element in the form of a thread 35, braided or spun from metal wires, for example, is attached in this recess 34 using a spot weld 36. Thread 35 is inserted in injection opening 7 and preferably penetrates injection opening 7 over its entire length.

If valve needle 3 with valve closing body 4 illustrated in FIG. 1 is lifted from valve seat surface 6, fuel flows to, and through, injection opening 7. The fuel flow induces vibrations in thread 35 through the turbulence which occurs. Thread 35 variously comes into contact with different sections of the wall of injection opening 7 and knocks off any coking deposits at those spots, and the coking residues are entrained by the flowing fuel. This movement of thread 35 is most pronounced in the outlet area of injection opening 7 on the combustion chamber side. However, it is also in this area where most coking occurs. By attaching thread 35 near the inlet-side section of injection opening 7 in recess 34, thread 35 is entrained into injection opening 7 by the flowing fuel and inserted there, should it slide out of it while the fuel injector is closed.

Injection opening 7, as illustrated in FIG. 3, may be formed on a perforated disk separate from valve seat body 5, instead of in valve seat body 5 itself.

What is claimed is:

1. A fuel injector for a fuel injection system of an internal combustion engine, comprising:

an actuator;

a valve needle actuatable by the actuator;

a valve closing body coupled to the valve needle and actuatable by the valve needle;

a valve seat body having a valve seat surface, wherein the valve closing body and the valve seat surface of the valve seat body form a sealing seat;

at least one injection opening downstream from the valve seat surface; and an elastic vibration element attached on an inlet side of the at least one injection opening, wherein the vibration element penetrates the at least one injection opening and leaves a portion of cross-section of the at least one injection opening free, wherein the element is attached in a lateral recess on the inlet side of the injection opening.

2. The fuel injector according to claim 1, wherein the vibration element is a thread.

3. The fuel injector according to claim 2, wherein the thread is made of a heat-resistant material.

4. The fuel injector according to claim 3, wherein the thread is made of metal.

5. The fuel injector according to claim 4, wherein the thread is attached in the lateral recess on the inlet side of the injection opening by a spot weld.

6. The fuel injector according to claim 1, wherein the at least one injection opening is formed in the valve seat body.

7. The fuel injector according to claim 1, wherein the at least one injection opening is formed in a perforated disk separate from the valve seat body.

\* \* \* \* \*